United States Patent [19]

Ewen

[11] Patent Number: 4,941,543
[45] Date of Patent: Jul. 17, 1990

[54] REAR WHEEL SUSPENSION AND STEERING SYSTEM

[75] Inventor: James G. Ewen, Royal Oak, Mich.

[73] Assignee: DLMA Transportation Inc., Troy, Mich.

[21] Appl. No.: 289,027

[22] Filed: Dec. 23, 1988

[51] Int. Cl.⁵ ............................................. B60K 17/30
[52] U.S. Cl. ...................................... 180/254; 180/252; 180/79
[58] Field of Search ...................... 180/73.1, 73.2, 73.4, 180/75, 79, 140, 252, 253, 254, 255, 256, 257, 24; 280/96.1, 103, 688

[56]  References Cited

U.S. PATENT DOCUMENTS

| | | | |
|---|---|---|---|
| 867,282 | 10/1907 | MacFarren | 180/140 |
| 1,850,921 | 3/1932 | Ghiselli | 180/254 |
| 2,189,695 | 2/1940 | Alden | 180/254 |
| 2,356,164 | 8/1944 | Keese | 180/254 |
| 3,472,331 | 10/1969 | Baker et al. | 180/254 |
| 3,642,084 | 2/1972 | Takahashi | 180/257 |
| 3,765,698 | 10/1973 | Burrell | 180/254 X |
| 4,343,375 | 8/1982 | Manning | 180/73.1 |

Primary Examiner—Charles A. Marmor
Assistant Examiner—Wook Yoon
Attorney, Agent, or Firm—Reising, Ethington, Barnard, Perry & Milton

[57]  ABSTRACT

A rear wheel suspension and steering system utilizing a rectilinear shape dead axle of the type wherein a differential mechanism is mounted directly to a vehicle body so as to descend within the dead axle in such a way that the differential can move vertically relative to the dead axle. More specifically, the invention relates to a system whereby the rear wheels are mounted upon the dead axle so as to be steerable relative thereto.

2 Claims, 4 Drawing Sheets

REAR WHEEL SUSPENSION AND STEERING SYSTEM

BACKGROUND OF THE INVENTION

The present invention relates to a suspension or axle system for a vehicle, such as a bus or truck, wherein the rear wheels are steerable. The rear wheel steering system is intended to be utilized with a vehicle having combined with a conventional front wheel steering system.

It is now well appreciated that a vehicle having steerable front and rear wheels provides the bus operator with many maneuvering advantages not available with a conventional front wheel steering vehicle. While combined front and rear wheel steering systems have advantages for any type of vehicle, such combination is particularly helpful with relatively long vehicles such as buses and trucks. Specifically, it is common that when such later vehicles turn a corner, they either have to make a very wide turn or, alternatively, in making a short turn the rear wheels of the vehicle are apt to either bump or ride over a curb. By having rear wheels that are steerable, the rear end of the vehicle may be kept away from a curb while the front end of the vehicle is making a relatively sharp turn.

It is not only an object of the present invention to provide a steerable rear wheel system, but also to combine such system with a suspension or dead axle system which provides exceptional lateral stability for the vehicle. The stability is achieved basically in two ways. First, the unique axle design allows the body supporting springs to be located outboard in general longitudinal alignment with the steerable wheels. Second, the associated differential drive mechanism is mounted directly to the vehicle body and coacts with the axle to enable the body to be supported closer to the ground to thereby enhance stability as well as enabling the vehicle body to be disposed lower to the ground which also enhances lateral stability.

The basic suspension or axle system with which applicant's invention is combined is shown in U.S. Pat. No. 4,343,375 VEHICLE DRIVE WHEEL SUSPENSION - Manning. The advantages of the Manning suspension as described in the aforementioned patent are also applicable to the present application and are incorporated herein by reference. The advantage of the earlier Manning system are to provide a suspension wherein the unsprung weight of the system is greatly reduced both by supporting the differential from the vehicle body rather than the axle as well as providing a dead axle system which may be made of a much lighter construction then conventionally forged axle systems.

BACKGROUND ART

The most relevant prior art patent is the aforementioned Manning U.S. Pat. No. 4,343,375 and the prior art cited there against. However, none of this prior art relates to a system having steerable rear wheels as disclosed in the present application. The basic teaching of the earlier Manning patent is to provide a rear wheel support and driving system comprising a rack-type dead axle which supports a vehicle body thereupon through suitable spring means. A pair of wheels are rotatably supported by the dead axle while differential drive mechanism is supported upon the vehicle body so as to be movable with the body relative to the dead axle. The differential mechanism includes a power input shaft, and a pair of power output shafts. A pair of live axles drivingly connect the differential output shafts with the wheels. Manning's dead axle is generally rectilinear in shape and has a first pair of longitudinal beams respectively transversely spaced outboard of the differential mechanism and a second pair of cross beams respectively spaced fore and aft of the differential and secured to the first pair of beams. Applicant has uniquely modified the aforedescribed Manning suspension so as to make the wheels associated therewith steerable.

Applicant is unaware of any other prior art that is relevant to the subject system.

DISCLOSURE OF THE INVENTION

The Manning suspension and dead axle system, as described above and as shown in the aforenoted patent, has been modified as hereinafter described to provide the steerable rear wheel system of the present invention. Applicant's suspension system includes a rack-type dead axle member having transversely spaced longitudinal beam members and interconnecting cross beam members as described above. The longitudinal beams include transversely aligned openings generally aligned with the differential output shafts. Hollow sleeves are fixed within the beam openings and project transversely outboard of the beams. The live axles extend through the sleeves and driveably connect with the rear wheels. A ball joint assembly is mounted on the sleeves and steerably supports the wheels. A power steering device is supported upon the dead axle and is operatively connected to the ball joint assembly to provide the means for steering said wheels.

The details of the invention will be clearly understood from the following description of a preferred embodiment thereof which is shown in the drawings wherein:

DESCRIPTION OF THE PREFERRED EMBODIMENT

Figure 4:
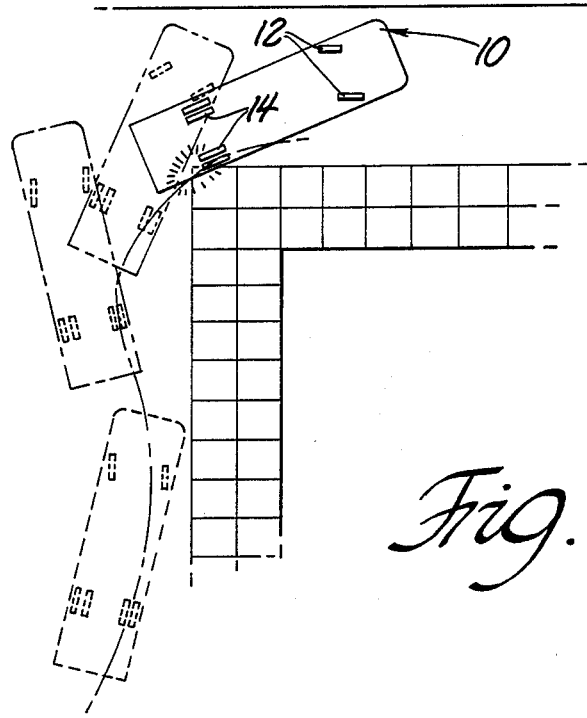
FIG. 4 is a diagrammatic representation of a bus utilizing only a front steering arrangement.
Figure 5:
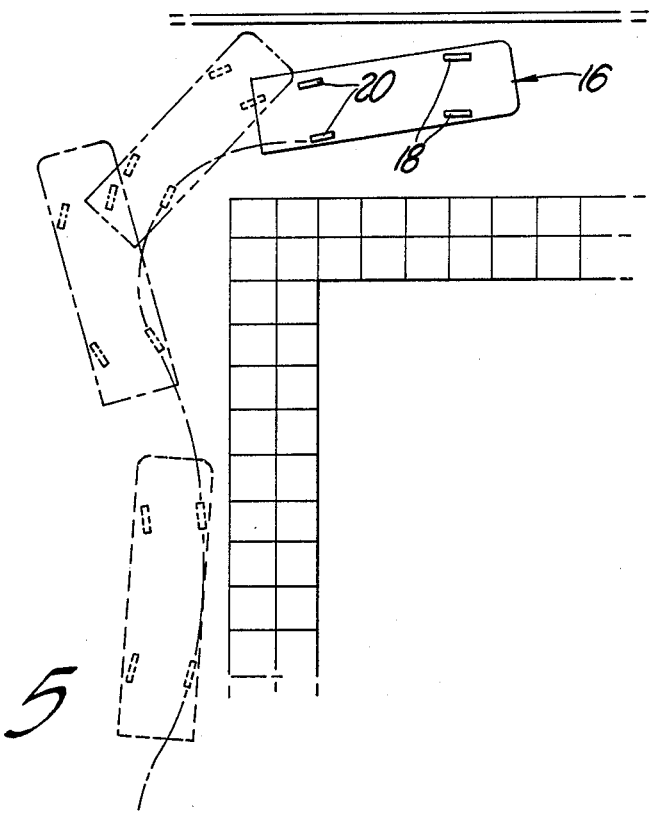
FIG. 5 is a diagrammatic representation of a bus utilizing a front and rear wheel steering system of the type permitted by the subject invention.

The representations shown in FIGS. 4 and 5 are for the purpose of illustrating the improved cornering ability of a vehicle utilizing both and front and rear steerable wheels. In FIG. 4 a bus is indicated generally at 10 and includes steerable front wheels 12 and fixed rear driving wheels 14. In driving around a corner intersection, bus 10 must first move well away from the curb of the street along which it is driving before making a right hand turn onto another street or, alternatively, the inside set of rear wheels 14 will ride over the curb. By contrast, bus 16 utilizes steerable front wheels 18 and steerable rear wheels 20. With this latter steering arrangement, the rear end of bus 16 may be kept away from the curb by turning the rear wheels outwardly and thus enabling the bus to negotiate the right hand turn by utilizing a smaller overall turning radius.

The suspension and steering system for the rear wheels 20 will now be described in detail. As already noted, the basic dead axle system utilized in the present invention is of the type shown and described in U.S. Pat. No. 4,343,375 Vehicle Drive Wheel Suspension - Manning. The advantages of this basic type of dead axle arrangement are set forth in the aforementioned patent and are incorporated by reference herein. The Manning suspension has several related advantages. First, by connecting the differential drive mechanism directly to the vehicle body, the unsprung weight of the vehicle is reduced enabling the construction of a simplified and thus less costly dead axle assembly. Secondly, by not mounting the differential mechanism upon the dead axle, the overall height of the vehicle may be reduced. Finally, the Manning dead axle is of such construction as to permit the body supporting springs to be mounted outboard of the longitudinal centerline of the vehicle and in general alignment with the rear wheels enhance the stability of the vehicle. Both the outboard mounting of the body supporting springs and the lower vertical height permitted by the Manning suspension together contribute to a vehicle having much improved roll stability.

Figure 1:
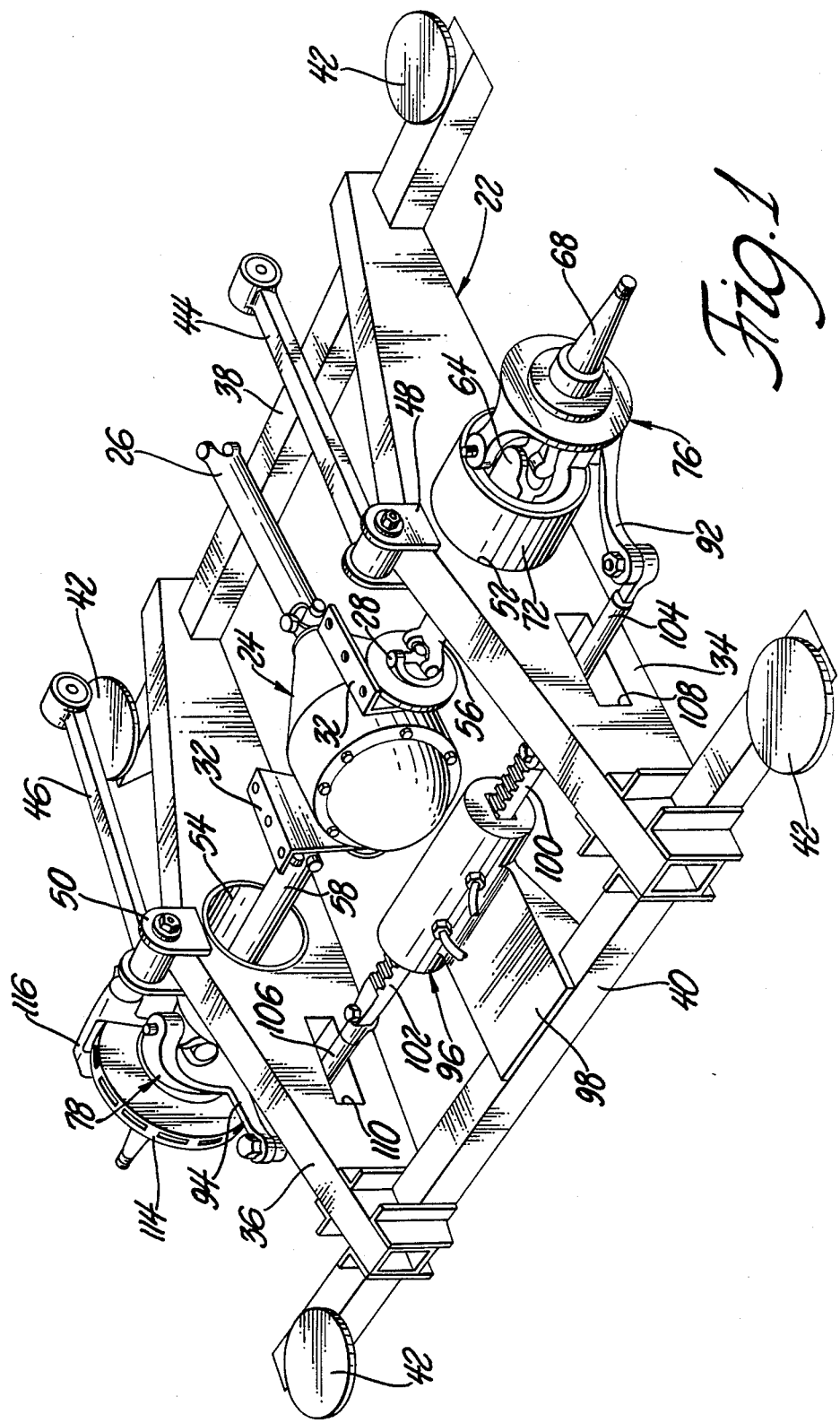
FIG. 1 is a perspective view of the rear wheel suspension and steering system.
Figure 2:
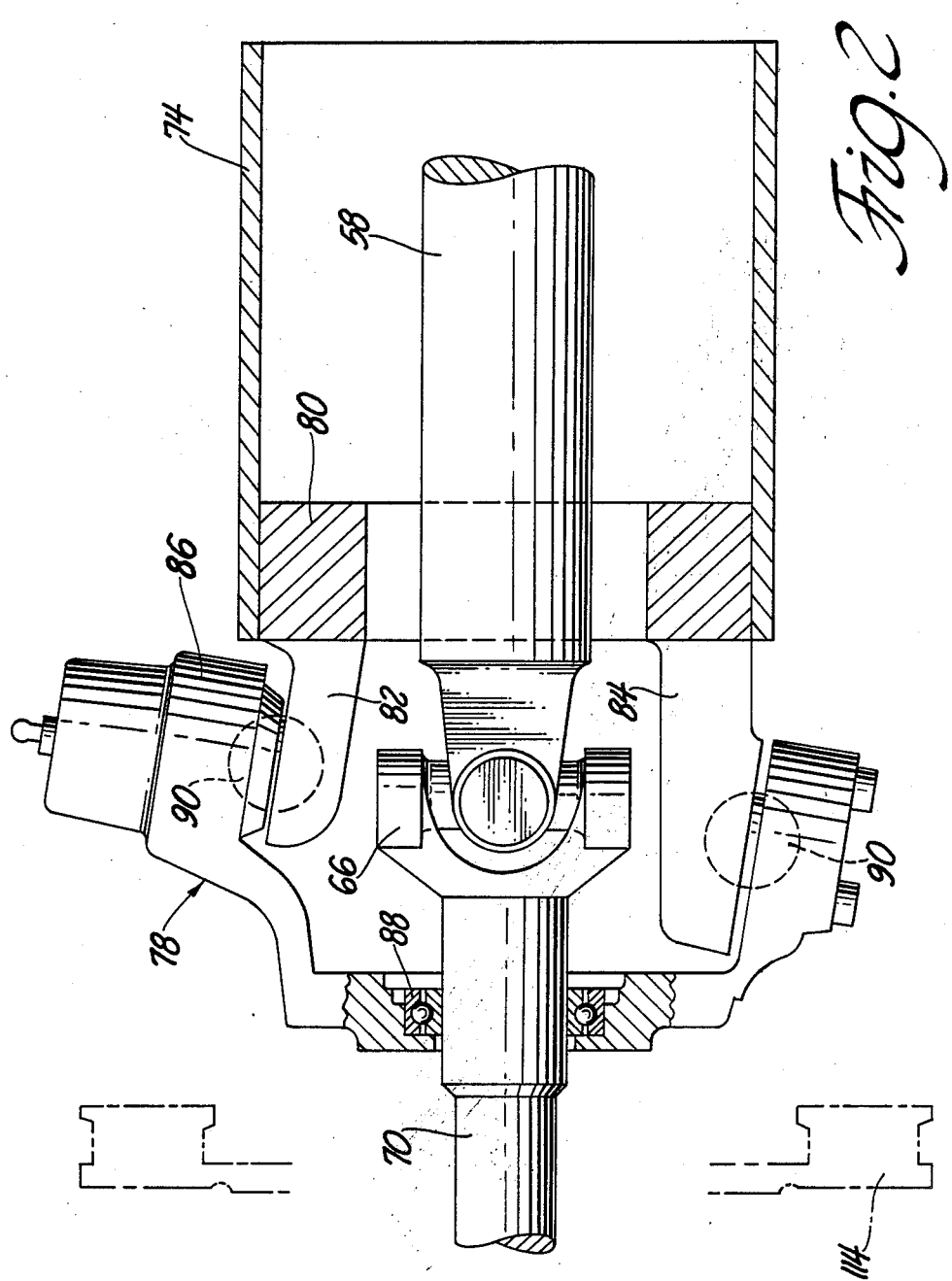
FIG. 2 is an enlarged detailed view of the ball joint assembly and sleeve structure through which the wheels are mounted to the dead axle.

Referring to the views of FIGS. 1, and 2, a dead axle is indicated generally at 22. A differential drive mechanism is indicated generally at 24 and includes a power input shaft 26 and a pair of power output shafts 28 and 30. The power input shaft 26 is suitably connected through a universal joint, not shown, to a propeller shaft driven by an engine and transmission neither of the latter of which are shown. As will subsequently be described, the differential output shafts 28 and 30 provide driving power to the rear wheels 20. The casing for differential 24 includes a pair of side bracket members and flanges 32 through which the differential is supported directly upon the vehicle body not shown. Thus, the differential mechanism is supported on and moves with the vehicle body and, as will be seen subsequently, such vertical or other movement may be relative to the movement or lack of movement of the dead axle 22.

Dead axle 22 is generally of a rectilinear shape and includes a pair of longitudinal beam members 34 and 36 which extend generally parallel to the centerline of the vehicle and are disposed laterally or transversely outboard of the differential mechanism 24. A pair of cross beam members 38 and 40 are integrally secured to the longitudinal beams 34 and 36 and extend generally transversely of the vehicle centerline and are respectively disposed fore and aft of differential 24.

As best seen by looking in the left end of longitudinal beams 34,36 as viewed in FIG. 1, the beams are of a light weight box construction formed by welding up relatively light weight plate members. While not similarly shown, cross beams 38,40 are of the same plate construction. It is obvious that this type of construction is substantially lighter and at least as strong as conventional dead axles utilizing a forged construction. The box construction of the individual dead axle beams greatly contributes to the reduced mass of the unsprung suspension.

Figure 3:
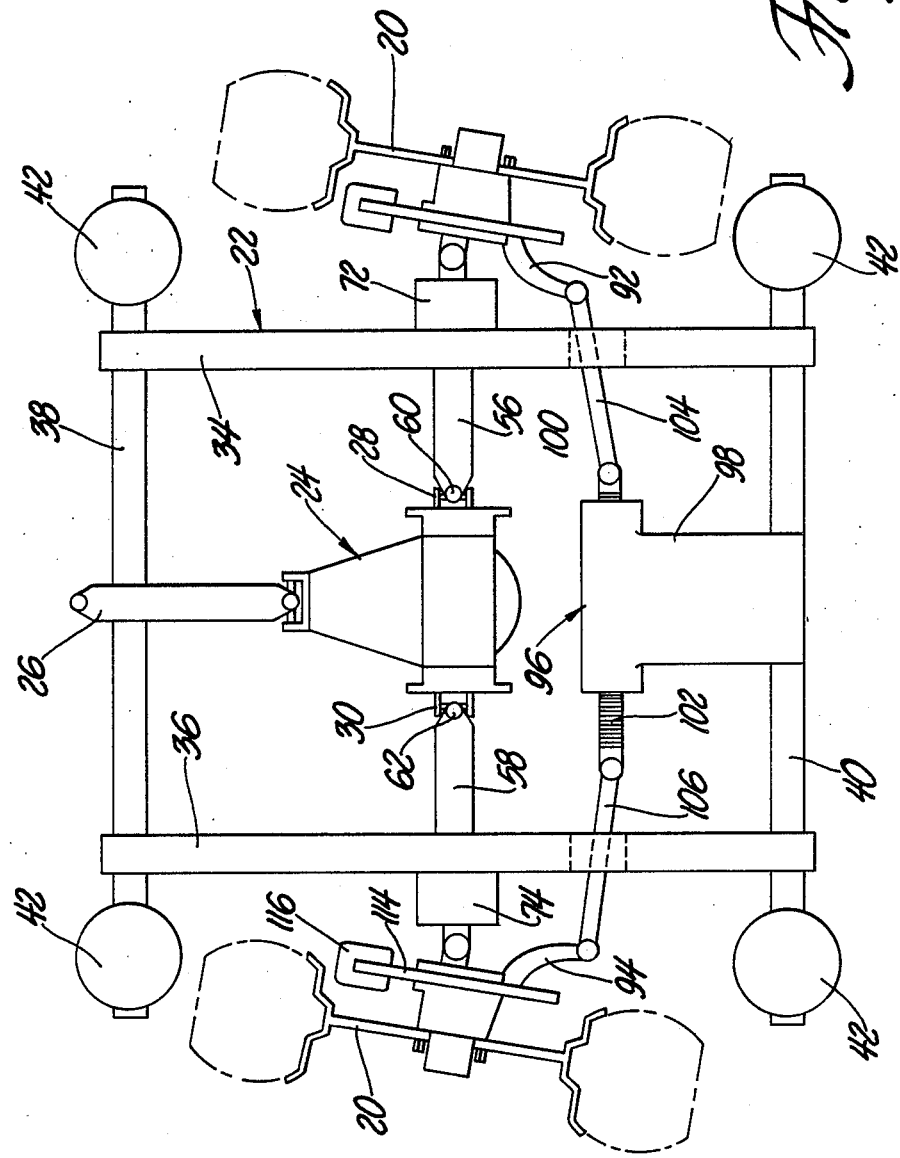
FIG. 3 is a schematic plan view of the rear wheel suspension system and steering system therefor.

Cross beam members 38 and 40 extend transversely beyond the longitudinal beam members 34 and 36 so as to provide as wide a spring support base as possible. More specifically and in the modification shown, pads 42 are fixed to the outer most ends of the cross beams and are adapted to support suitable air bag springs not shown. As best seen in FIG. 3, the air bag support pads 42 are disposed transversely outboard of the longitudinal beams 34 and 36 and are in general alignment with the wheels 20. In this manner, maximum lateral or roll stability is provided.

Differential input shaft 26 and dead axle cross beam member 38 are suitably vertically spaced to allow vertical movement of the differential 24 relative to the dead axle 22 without the shaft striking the cross beam.

Radius rods 44 and 46 are suitably pivotally supported at one end through brackets 48 and 50 to longitudinal beams 34,36 and are similarly connected at their other end to the unshown vehicle body, thus, articulating the dead axle to the body in such a way that the body can move vertically relative to the dead axle.

The arrangement whereby the wheels 20 are steerably supported upon dead axle 22 will now be described in detail. Longitudinal beams 34 and 36 each includes a transverse opening 52 and 54 disposed generally midway between the fore and aft ends of the beams and transversely aligned with the output shafts 28 and 30 of the differential 24. Rear wheel drive shafts or live axles 56 and 58 are connected at their inner ends to differential output shafts 28 and 30 through suitable universal joints 60 and 62. As seen in FIG. 2, the other ends of drive shafts 56 and 58 are likewise connected through suitable universal joints 64 and 66 to wheel drive spindles 68 and 70. As best seen in FIGS. 1 and 2, the diameters of drive shafts 56 and 58 are substantially smaller than that of the transversely aligned longitudinal beam openings 52 and 54. This arrangement allows the drive shafts 56 and 58 to move relative to the dead axle 22 without interference therewith. As needed, suitable slip spline connections may be provided between live axles 56 and 58 and either differential output shafts 28 and 30 or wheel spindles 68 and 70 to accommodate relative vertical movement between the differential and the dead axle.

Sleeves 72 and 74 are respectively secured within longitudinal beam openings 52 and 54 so as to be flush with the inside of said beams and to project transversely outwardly from the outer faces of the beams. As best seen in FIGS. 1 and 2, ball joint assemblies are indicated generally at 76 and 78. The details of the ball joint assembly will be described in relation to assembly 78 as shown in FIG. 2. The assembly includes a first inner support casting 80 fixed within the outer end of sleeve 74 and including outwardly projection arms 82 and 84. A coacting outer casting 86 rotatably supports wheel spindles 70 through a bearing member 88. Ball joints or other suitable bearing means 90 are disposed between outer casting 86 and inner casting arms 82 and 84 and are generally aligned through the universal joint 66 whereby the outer casing 86, spindle 70 and wheel 20 may be articulated relative to dead axle sleeve 74 to provide steerability for the rear wheels 20.

As best seen in FIG. 1, ball joint assemblies 76 and 78 include steering arms 92 and 94 integrally formed with outer ball joint assembly casting 86. A power steering assembly is indicated generally at 96 and is supported upon cross beam 40 through a suitable bracket member 98. The power steering assembly 96 may be of any suitable type. In the illustrated embodiment, power steering assembly 96 includes a pair of transversely extending rack members 100 and 102 adapted to be suitably driven by a pinion member, not shown, within the assembly. Rack members 100 and 102 are suitably articulated to steering rods 104 and 106. A second pair of aligned openings 108 and 110 are formed transversely through longitudinal beams 34 and 36. Steering rods 104 and 106 extend through openings 108 and 100 and are articulated at their outer ends to wheel steering arms 92 and 94. The power steering assembly 96 is suitable coordinated with the front wheel steering system as to permit the rear wheels to be turned either in the opposite direction from the front wheels or in the same direction as the front wheels dependent upon the type of coordinated steering movement of the vehicle desired. This steering coordinating mechanism is not a part of the subject invention.

A disc brake assembly is indicated generally at 112. The assembly includes a disc 114 suitably fixed for rotation to wheel spindles 68 and 70 and a braking pad 116.

It is apparent that other modifications of the wheel suspension and steering system are possible within the intended scope of the invention as set forth in the hereinafter appended claims.

What is claimed is:

1. A rear wheel support and driving system of the type comprising a rack-type dead axle (22) adapted to support a vehicle body thereupon through suitable spring means, a air of wheels (30) rotatably supported upon said dead axle, a differential drive mechanism (24) adapted to be supported upon the vehicle body and movable with said body relative to the dead axle, the differential mechanism including a power input shaft (26) and power output shafts (28 and 30), a pair of live axles (56 and 58) drivingly connecting the output shafts with said wheels, the dead axle being generally rectilinear in shape and having a first pair of longitudinal beams (34 and 36) respectively transversely spaced outboard of said differential mechanism, a second pair of cross beams (38 and 40) respectively spaced fore and aft of said differential mechanism and secured to the first pair of beams, the improvement comprising:
   A. said longitudinal beams (34 and 36) including transversely aligned openings (52 and 54);
   B. hollow sleeves (72 and 74) secured within the beam openings (52 and 54) and projecting transversely outboard of beams (34 and 36), said live axles (56 and 58) extending through said sleeves;
   C. means (76 and 78) for steerably supporting the wheels upon the sleeves; said supporting means including a steering arm (92-94) fixed thereto and operatively connected to the power steering device (96);
   D. a power steering device (96) mounted on the dead axle and operatively connected to the steerable wheel supporting means (76 and 78) for imparting steering movement to the wheels, the power steering device (96) includes a pair of operating arms (100 and 102) extending generally parallel to the cross beam (40), rod members (104 and 106) articulated at their ends between said operating arms and the steering arms (92 and 94), each longitudinal beam (34-36) includes a second opening (108-110) intermediate the first opening (52-54) and the dead axle cross beam (40), the rod members (104 and 106) respectively extending through the second openings whereby the outer end of each rod member is disposed outboard of the associated longitudinal beam (34 and 36).

2. A rear wheel support and driving system of the type comprising a rack-type dead axle (22) adapted to support a vehicle body thereupon through suitable spring means, a pair of wheels (20) rotatably supported upon said dead axle, a differential drive mechanism (24) adapted to be supported upon the vehicle body and movable with said body relative to the dead axle, the differential mechanism including a power input shaft (26) and power output shafts (28 and 30), a pair of live axles (56 and 58) drivingly connecting the differential output shafts with wheel driving spindles (68 and 70) through universal joints (60-62 and 64-66), the dead axle being generally rectilinear in shape and having a first pair of longitudinal beams (34 and 36) respectively transversely spaced outboard of said differential mechanism, a second pair of cross beams (38 and 40) respectively spaced fore and aft of said differential mechanism and secured to the first pair of beams, the improvement comprising:
   A. said longitudinal beams (34 and 36) respectively including openings (52 and 54) transversely aligned with the differential output shafts;
   B. cylindrical sleeves (72 and 74) respectively secured within the beam openings (52 and 54) and projecting transversely outboard of beams (34 and 36), said live axles (56 and 58) extending through said sleeves, the diameter of said sleeves being sufficient to permit the live axles to move vertically relative thereto as the differential mechanism moves vertically relative to the dead axle;
   C. ball joint assemblies (76-78) respectively steerably supporting the wheels (20) upon the sleeves (72 and 74), each ball joint assembly includes an inner member (80) secured within the outer end of sleeve (72-74), said inner member including upper and lower arms (82 and 84) projecting outboard of each sleeve, an outer member (86) rotatably supporting wheel spindle (68-70), and bearing members (90) supporting outer member (86) upon the inner member (80) whereby the outer member pivots about an axis between the centers of the bearing members; and
   D. a power steering device (96) mounted upon the dead axle (22) and operatively connected to the ball joint assemblies to impart steering movement to the wheels.

* * * * *